US006581261B1

(12) United States Patent
Chen

(10) Patent No.: US 6,581,261 B1
(45) Date of Patent: Jun. 24, 2003

(54) LARGE SIZE CLAMPING DEVICE FOR DETACHING BEARING

(76) Inventor: Yu-Lin Chen, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/165,827

(22) Filed: Jun. 10, 2002

(51) Int. Cl.[7] .................................................. B23P 19/04

(52) U.S. Cl. ............................ 29/252; 29/261; 29/262; 29/246

(58) Field of Search .......................... 29/252, 261, 262, 29/296, 283, 258, 257, 259, 260, 267

(56) References Cited

U.S. PATENT DOCUMENTS 1,578,174 A * 3/1926 Robinson ..................... 29/252
3,111,752 A * 11/1963 Simmons ..................... 29/252
3,880,604 A * 4/1975 Hawkins ...................... 29/256
4,077,103 A * 3/1978 Kelley ......................... 29/259
4,167,057 A * 9/1979 Traynor ....................... 29/283
5,233,740 A * 8/1993 Chen ........................... 29/252

* cited by examiner

*Primary Examiner*—Joseph J. Hail, III
*Assistant Examiner*—Daniel G. Shanley

(57) ABSTRACT

A large size clamping device for detaching a bearing having three cambered base blocks is disclosed. An inner edge of each base block is formed with a thinner top cambered surface. Each side of the base block has a penetrating connecting hole. Three connecting rods are used to connect the three base blocks by each connecting rod passing through the connecting holes of two respective base blocks. Thereby, an area confined by the base blocks is adjusted by adjusting the connections of the base blocks and the connecting rods. Thus the clamping device is suitable for bearings of different sizes. Moreover, the forces between the bearing to be pulled out and the clamping devices are more uniform so that the bearing will not be harmed.

3 Claims, 11 Drawing Sheets

LARGE SIZE CLAMPING DEVICE FOR DETACHING BEARING

FIELD OF THE INVENTION

The present invention relates to a clamping device, and particularly to large size clamping device for detaching a bearing which can be used with a wheel puller.

BACKGROUND OF THE INVENTION

Referring to FIGS. 9 and 10, it is known that a wheel puller for pulling a bearing or other round shaped objects can be used with a clamping device. However, the prior art clamping device is formed by connecting two semicircle disks by using two screw rods. Therefore, it has only a finite range for adjusting an object being clamped by the clamping device. When forces are applied to auxiliary trays, the connections of screw rods and screw holes will become loose due to vibration therebetween. It is possible to affect the pulling operation, and moreover, the screw rods are possible bent so as to induce a danger to the user and possible to destroy the object to be pulled. Referring to FIG. 11, in the prior art, the clamping device is in contact with an outer edge of the object to be pulled and is not full matched to the contact surface of the object to be pulled. Therefore, the object is possibly harmed.

Moreover, the prior art clamping device is formed by two rigid arms and a wheel puller. Therefore, when a larger force is required in operation, the arms are easy to apply forces to the clamping device so that the structure is unstable. Moreover, the size of the object to be pulled is confined by the width of the two arms, and thus it can not be widely used in different size of objects.

SUMMARY OF THE INVENTION

Accordingly, the primary object of the present invention is to provide a large size clamping device for detaching a bearing, wherein the base blocks of a clamping device is equally spaced along a round shape. Thereby, the area confined by three base blocks of the clamping device can be adjusted conveniently.

Another object of the present invention is to provide a large size clamping device for detaching a bearing, wherein the forces between the bearing to be pulled out and the clamping devices are more uniform so that the bearing will not be harmed.

To achieve above objects, the present invention provides a large size clamping device for detaching a bearing having three cambered base blocks. An inner edge of each base block is formed with a thinner top cambered surface. Each side of the base block has a penetrating connecting hole. Three connecting rods are used to connect the three base blocks by each connecting rod passing through the connecting holes of two respective base blocks. Thereby, an area confined by the base blocks is adjusted by adjusting the connections of the base blocks and the connecting rods. Thus the clamping device is suitable for bearings of different sizes. Further the backside of the clamping device has an ejecting cambered edge for resisting against the inner radius of a bearing. Moreover, the forces between the bearing to be pulled out and the clamping devices are more uniform so that the bearing will not be harmed.

The various objects and advantages of the present invention will be more readily understood from the following detailed description when read in conjunction with the appended drawing.

DETAILED DESCRIPTION OF THE PREFERRED EMBODIMENTS

Figure 1:
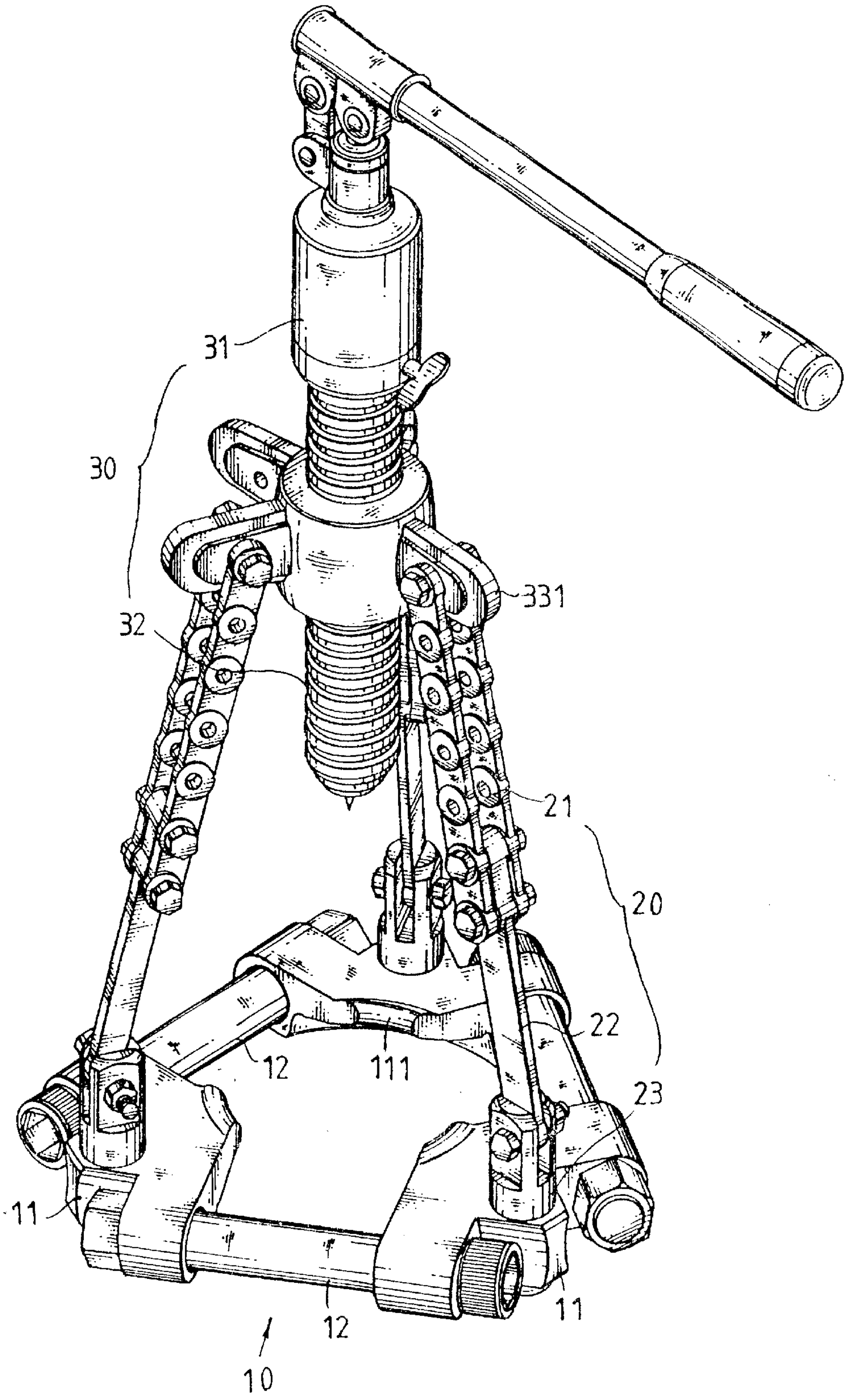
FIG. 1 is a schematic perspective view of the present invention.
Figure 2:
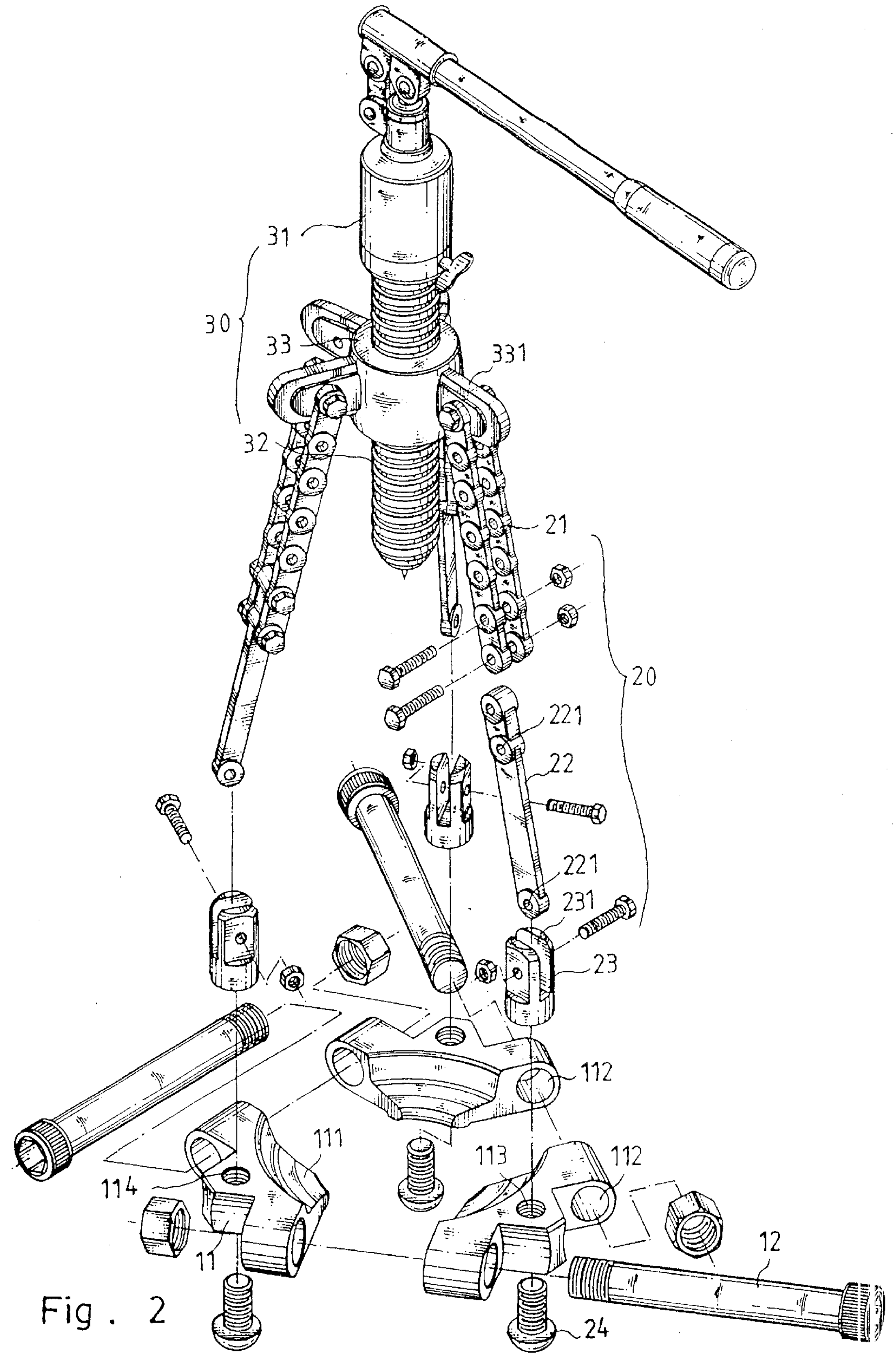
FIG. 2 is an exploded perspective view of the present invention.

Referring to FIGS. 1 to 8, the large size clamping device for detaching a bearing of the present invention is illustrated. However, the illustrated embodiment is just one example for realizing the present invention, while the present invention can be performed by other examples which are within the scope and spirit of the present invention.

With reference to FIGS. 1 to 6, the large size clamping device for detaching a bearing of the present invention is illustrated. The large size clamping device for detaching a bearing comprises a clamping device 10. The clamping device 10 is formed by a plurality of multi-sectional arms 20 and a wheel puller 30.

The wheel puller 30 is formed by an oil pressure driver 31, a main shaft 32, and an adjusting threaded block 33. The adjusting threaded block 33 spaced with an equal space has three ears 331 along the periphery of the adjusting threaded block 33. Thereby, multi-sectional arms 20 are pivotally installed in the ears 331. After the wheel puller 30 is assembled with the clamping device 10 for pulling an object. Since the wheel puller 30 is known in the prior art and thus the details will not be further described.

Each of the multi-sectional arms 20 is formed by pivotally connecting a porous pull plate 21, a pivotal rod 22, and a connecting block 23. The porous pull plate 21 is a flexible chain and has holes which are spaced equally. One end thereof is pivotally installed to an ear 331 of the adjusting threaded block 33, and another end thereof is pivotally connected to the pivotal rod 22. The two ends of the pivotal rod 22 are formed with respective pivotal holes 221. One pivotal hole is connected to the connecting block 23. The connecting block 23 is a round cylinder and has one end being formed as a concave connecting portion 231 for being engaged with a respective end of the pivotal rod 22. Another end of the connecting block 23 is formed with a screw hole (not shown). A screw rod passes through the screw hole so as to be firmly secured to the clamping device 10.

The clamping device 10 is formed by three base blocks 11 and three connecting rods 12. Each base block 11 has a cambered shape and an inner edge thereof is concave to form as a thin top-cambered surface 111. Two sides of the base block 11 have respective penetrating connecting holes 112. The connecting rod 12 exactly passes through the connecting hole 112. A connecting rod 12 passes through the respective connecting holes 112 of two base blocks 11 and then are locked thereto. The middle section of the connecting rod 12 has no threads so that it is engaged with the connecting hole 112 accurately. Thereby, the three base blocks 11 are assembled as a round clamping device 10. Moreover, each base block 11 is formed with an inner threaded hole 113 for being inserted by the screw rod 24 at one end of the connecting block 23.

Thereby, the clamping device 10 of the present invention has the advantages of easily adjustment of the area between the base blocks, uniform force distribution, and protecting object to be pulled out.

Figure 3:
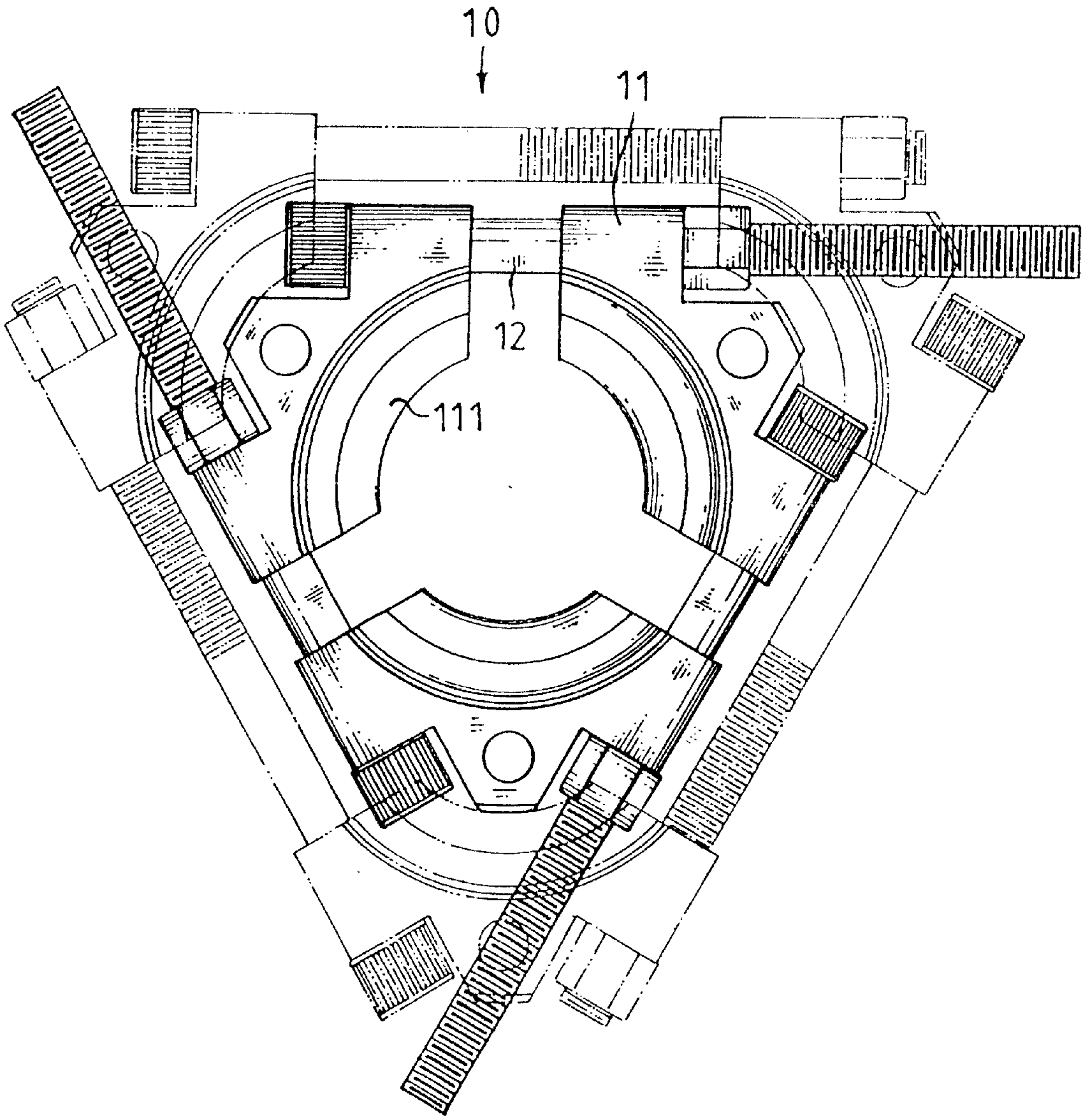
FIG. 3 is a schematic view showing the adjustment of area of the clamping device in the present invention.
Figure 4:
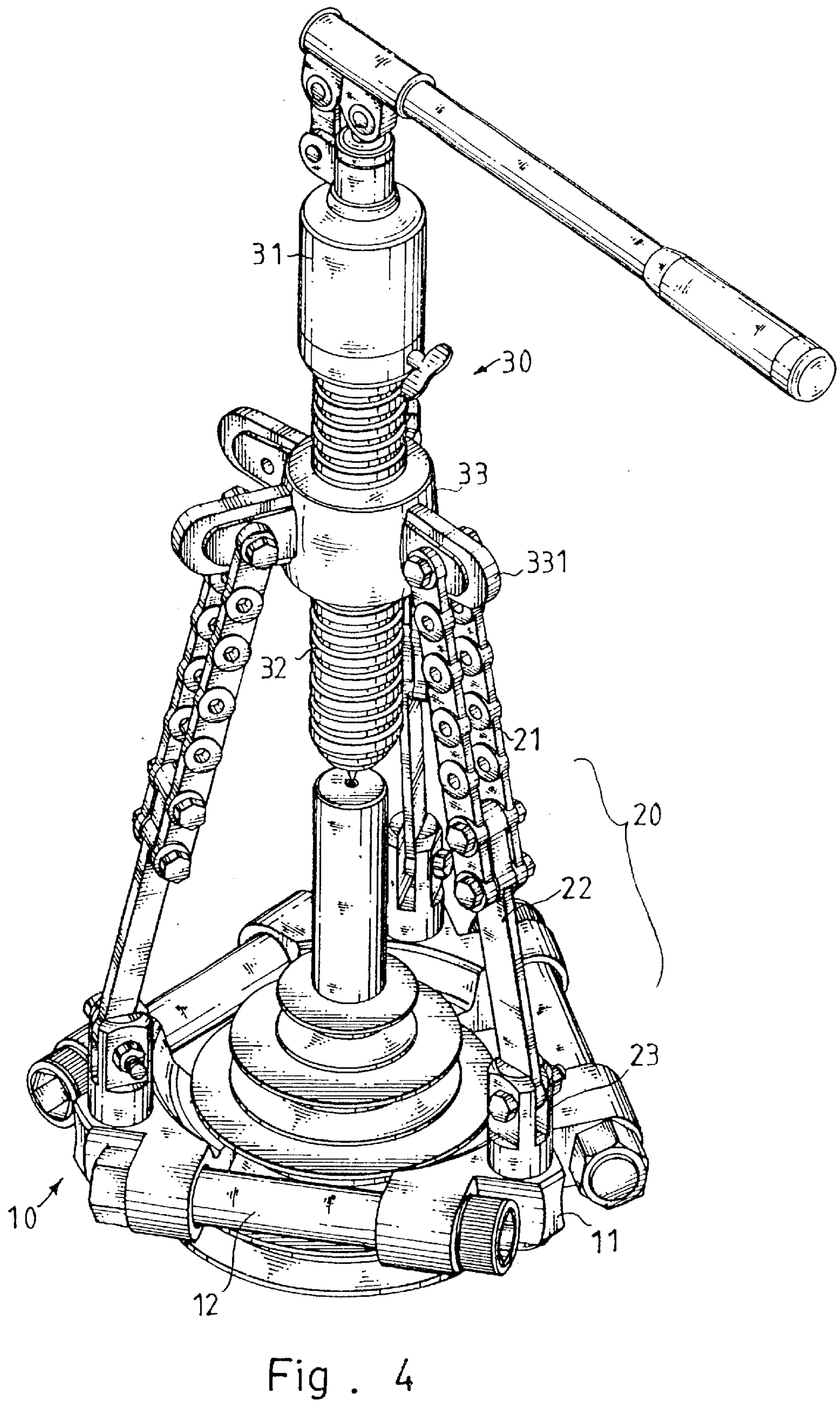
FIG. 4 shows one embodiment of the present invention.

With reference to FIG. 3, the three base blocks 11 are equally distributed around a round shape and thus the base blocks 11 can decide a round shape. Therefore, when the user holds and moves a base block 11, the two base blocks 11 will expand or contract with the change of the held base block 11. As a consequence, the size of the clamping device 10 can be adjusted easily. Meanwhile, the present invention can uniformly distribute the force between the clamping device 10 and an object to be pulled out.

Figure 5:
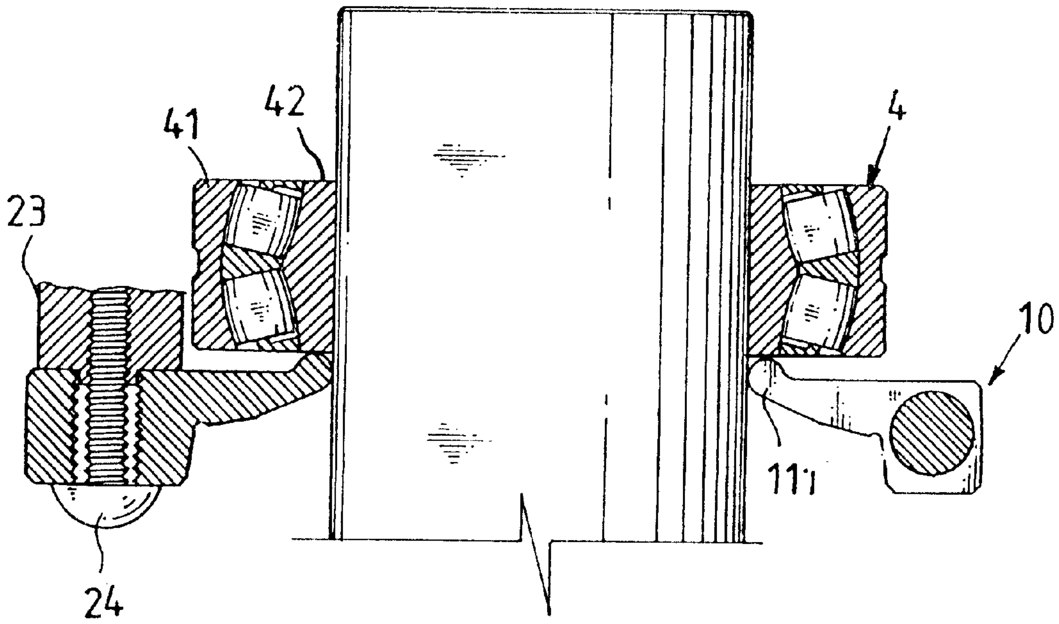
FIG. 5 is a schematic cross sectional view showing one application of the present invention.
Figure 6:
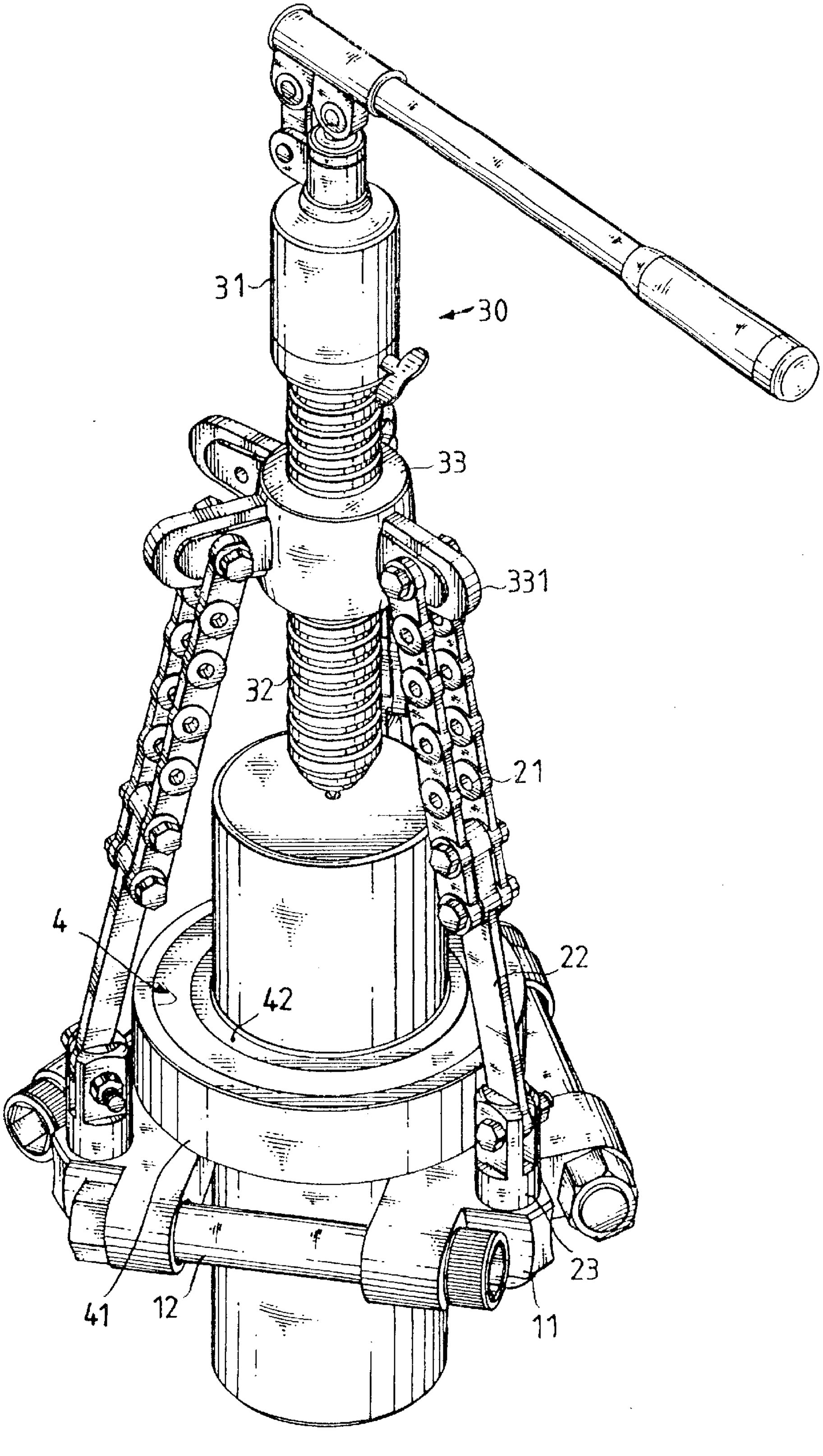
FIG. 6 shows another application of the present invention.

Referring to FIG. 5, when the clamping device 10 is in contact with the object to be pulled out, the top cambered surface 111 of the base block 11 resists against the inner radial surface 42 of the bearing 4 of the object to be pulled, while not resists against the outer radial surface 41 as the conventional technology. Therefore, in the pulling process, no too large twisting force is applied to the object to be pulled out. Therefore, the present invention is more usable.

Moreover, the clamping device 10 is connected to a wheel puller 30 through multi-sectional arms 20. As the wheel puller 30 is operated, since the multi-sectional arms 20 have many pivotal points, and thereby, the impacts can be properly adjusted so that the pull operation is more stable.

Figure 7:
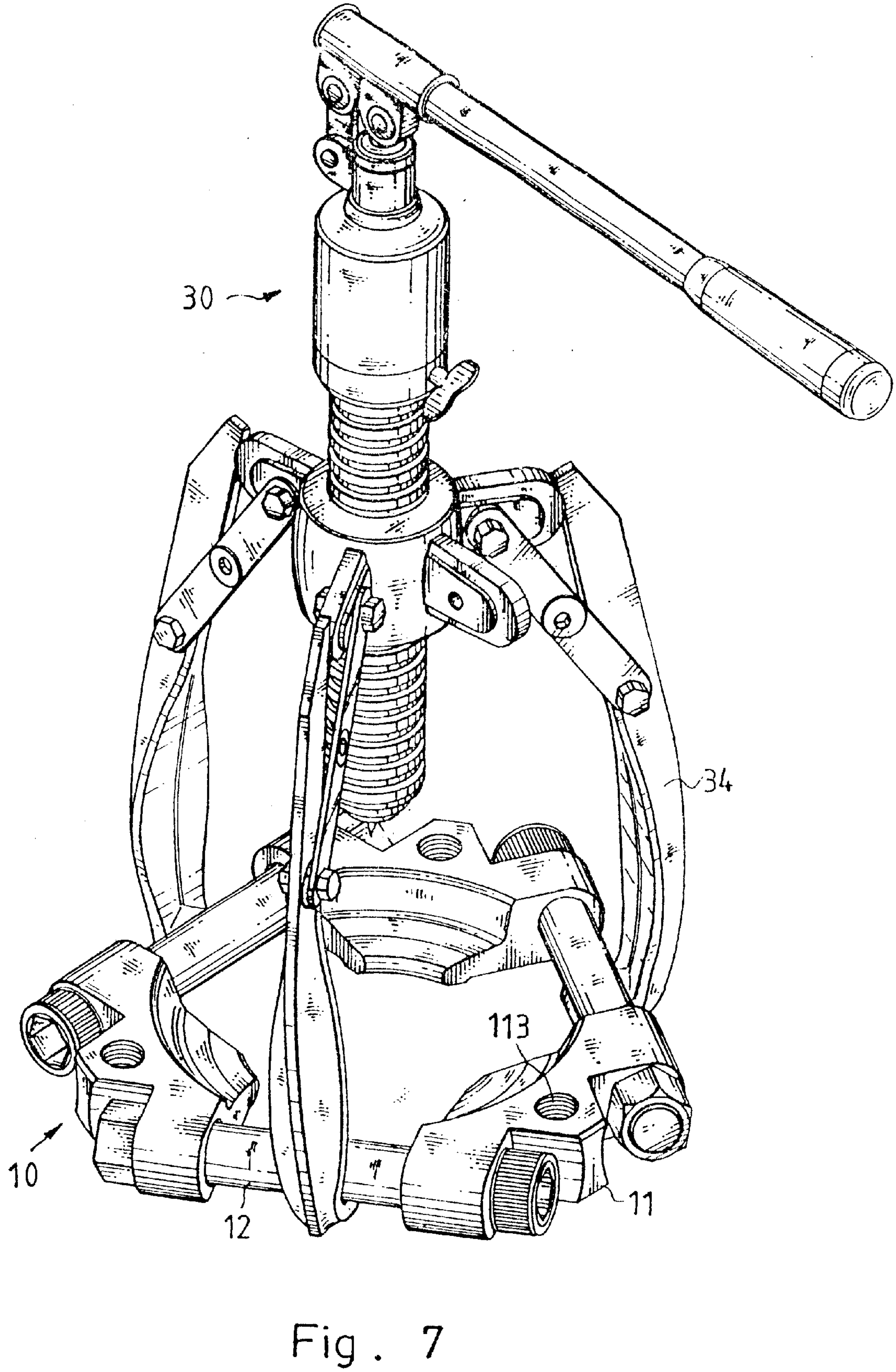
FIG. 7 is a schematic view showing that the present invention is utilized with a wheel puller.
Figure 8:
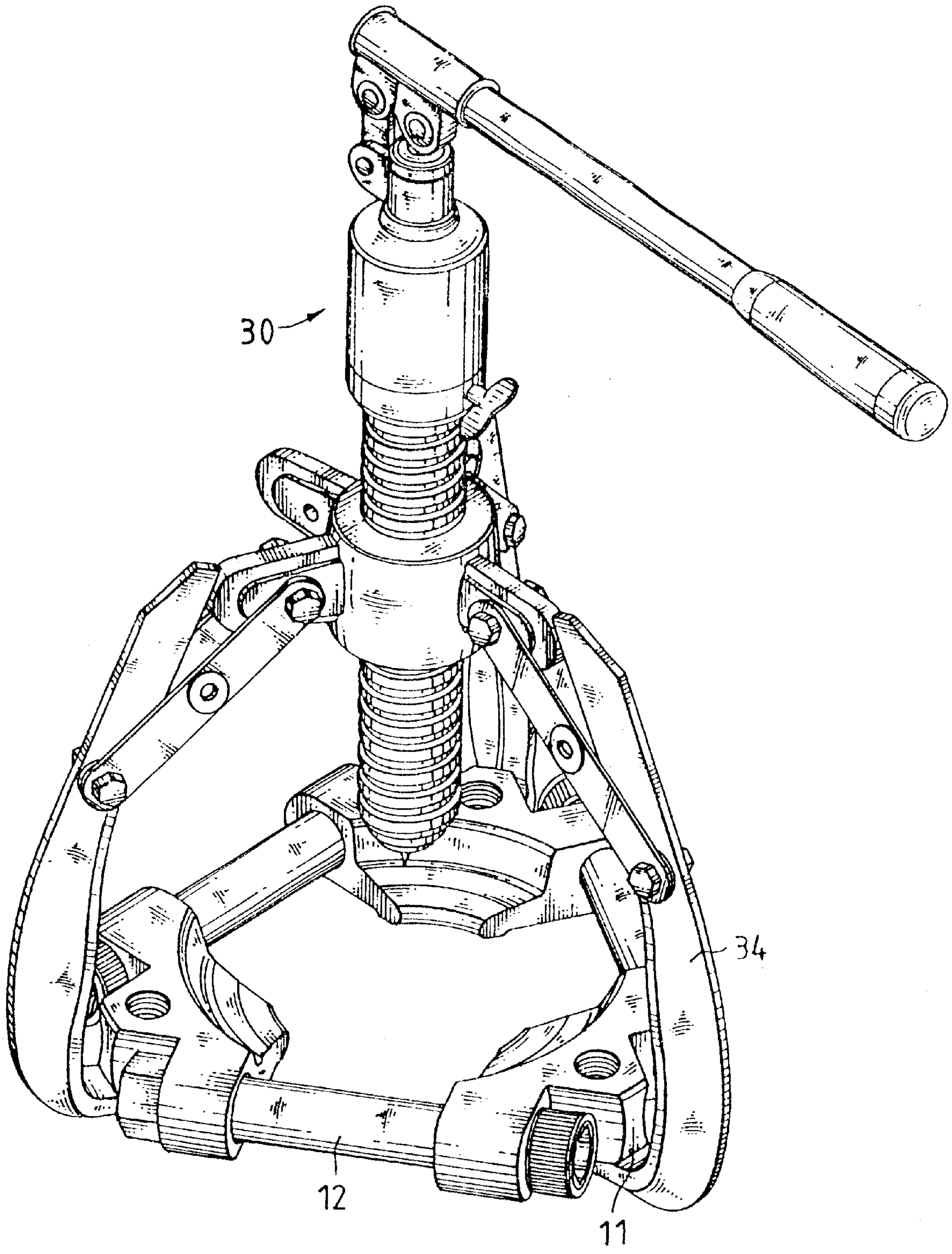
FIG. 8 is another schematic view showing that the present invention is utilized with a wheel puller.
Figure 9:
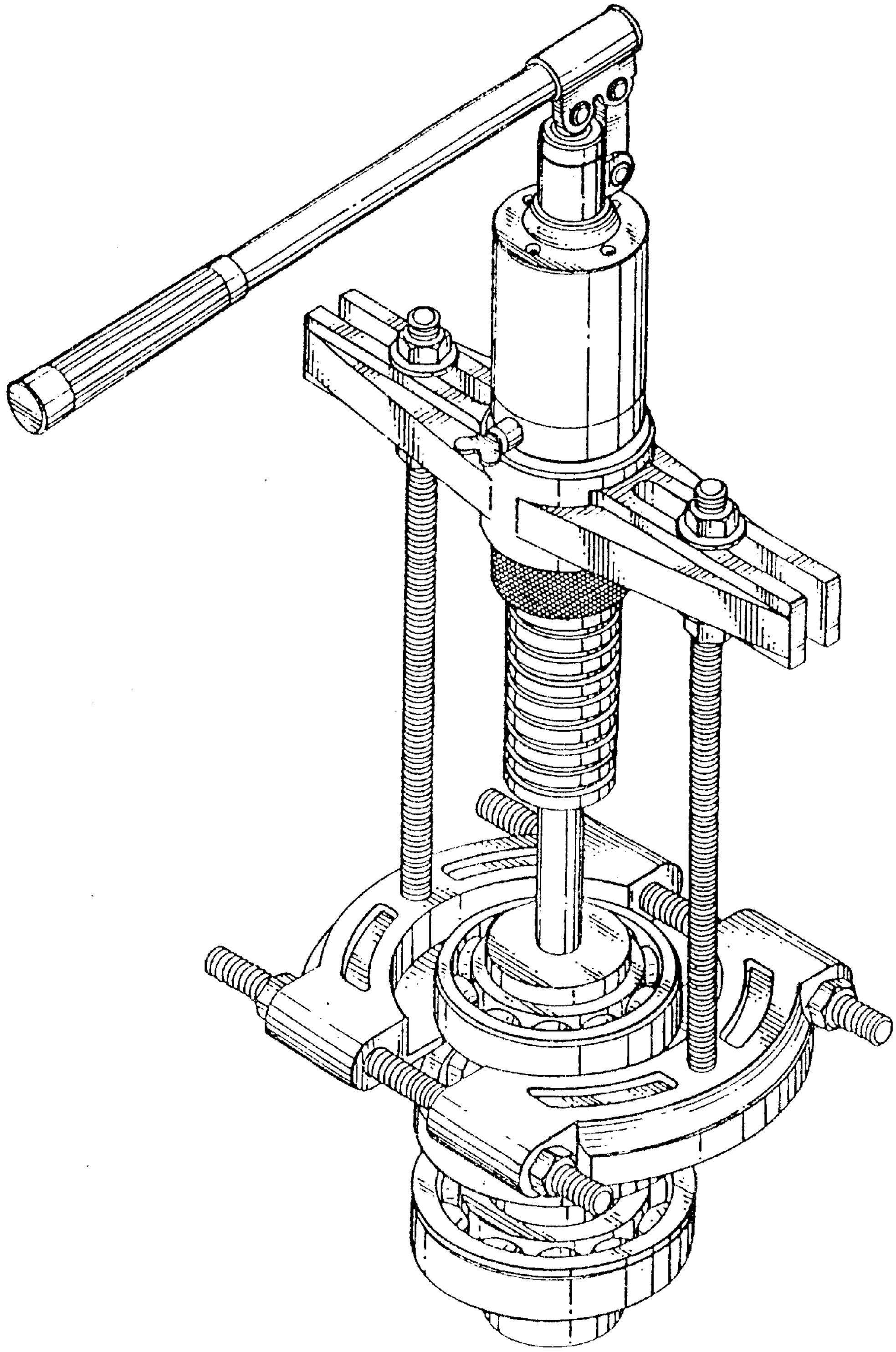
Fig. 9 PRIOR ART
FIG. 9 shows a schematic perspective view of a prior art structure.
Figure 10:
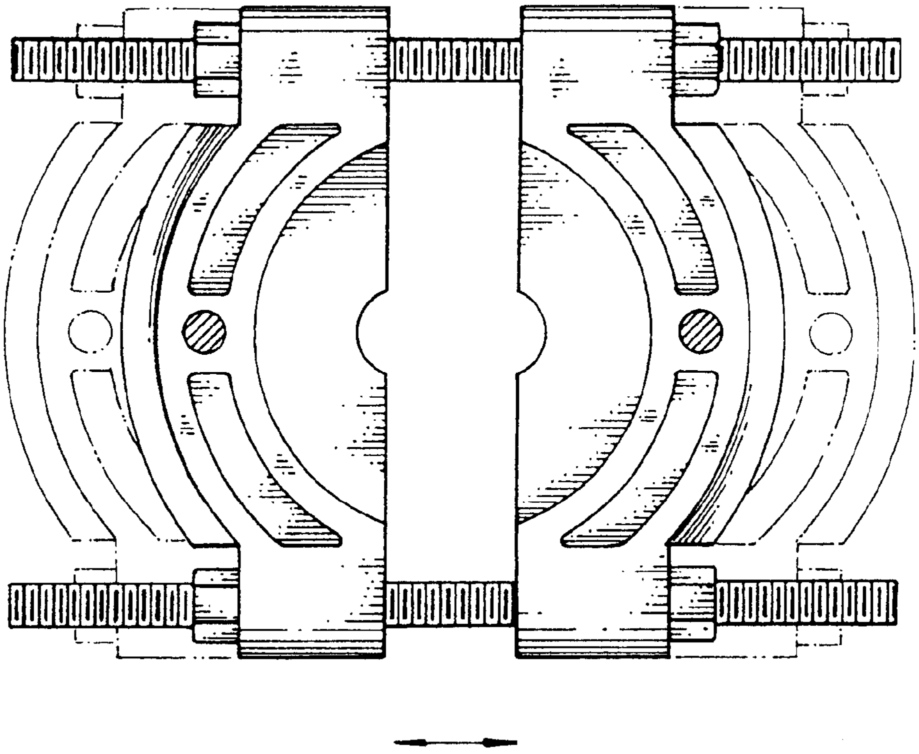
Fig . 10 PRIOR ART
FIG. 10 is a schematic view showing the area adjustment in the prior art structure.
Figure 11:
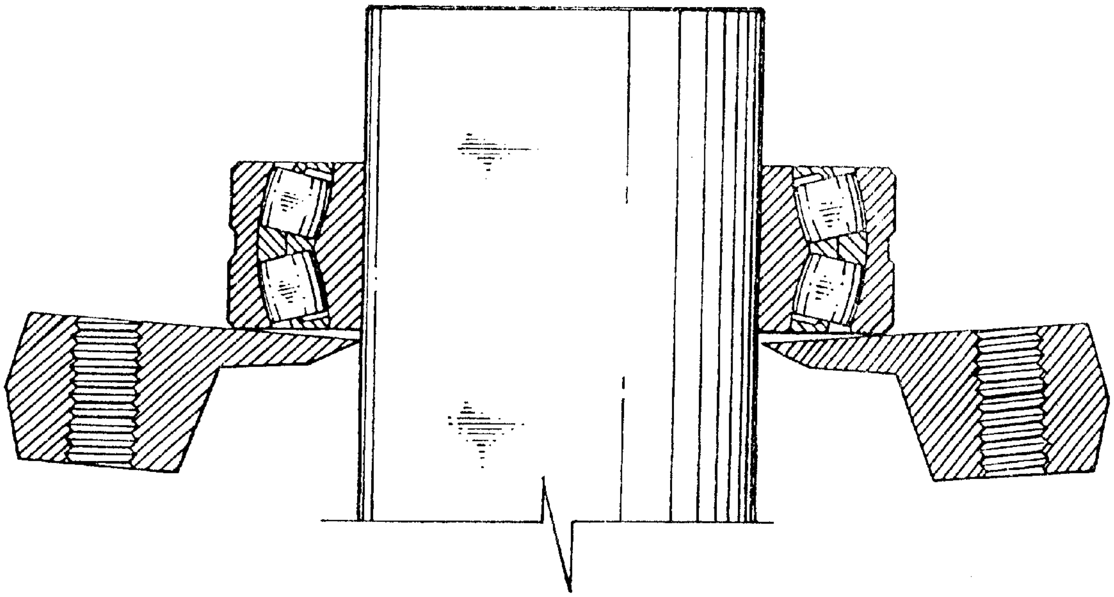
Fig . 11 PRIOR ART
FIG. 11 is a schematic cross sectional view showing one application of the prior art.

Moreover, referring to FIGS. 7 and 8, in using the clamping device 10 of the present invention, a conventional three claw type wheel puller 30 can be used. The condition is illustrated in drawings. The claw 34 of the wheel puller 30 is exactly firmly secured to the three base blocks 11 of the clamping device 10, or is used at outer edges of the connecting rods 12.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A large size clamping device for detaching a bearing, the clamping device having three base blocks, an inner edge of each base block being formed with a thinner top cambered surface, each side of the base block having a penetrating connecting hole, three connecting rods being used to connect the three base blocks by each connecting rod passing through the connecting holes of two respective base blocks; thereby, an area confined by the base blocks being adjusted by adjusting the connections of the base blocks and the connecting rods; thus the clamping device being suitable for bearings of different sizes and suitable for resisting against an inner radial surface of a [an] bearing; and moreover, the forces between the bearing to be pulled out and the clamping devices are more uniform, thereby, the bearing will not be damaged.

2. A large size clamping device for detaching a bearing; the clamping device having a wheel puller, a clamping unit and a plurality of multi-sectional arms; the wheel puller having an oil pressure driver, a main shaft, and an adjusting threaded block; one end of the multi-sectional arm being firmly secured to the adjusting threaded block, and another end thereof being pivotally connected to the clamping unit for pulling an object; characterized in that:

the large size clamping device for detaching a bearing has three cambered base blocks, an inner edge of each, base block is formed with a thinner top cambered surface, each side of the base block has a penetrating connecting hole; three connecting rods are used to connect the three base blocks by each connecting rod passing through the connecting holes of two respective base blocks; thereby, an area confined by the base blocks being adjusted by adjusting the connections of the base blocks and the connecting rods; thus the large size clamping device being suitable for bearings of different sizes and suitable for resisting against an inner radial surface of a bearing; and moreover, the forces between the bearing to be pulled out and the large size clamping devices are more uniform so that the bearing will not be damaged.

3. A large size clamping device for detaching a bearing as claimed in claim 2, wherein each of the multi-sectional arms is formed by pivotally connecting a porous pull plate, a pivotal rod, and a connecting block; the porous pull plate has holes which are equal spaced; one end of the porous pull plate is pivotally installed to an ear of the adjusting threaded block, and another end thereof is pivotally connected to the pivotal rod; two ends of the pivotal rod are formed with respective pivotal holes; one pivotal hole is engaged with the connecting block; one end of the connecting block is formed as a concave connecting portion for being engaged with a respective end of the pivotal rod; and another end of the connecting block is formed with a screw hole; and a screw rod passes through the screw hole so as to be firmly secured to the base block of the large size clamping device.

* * * * *